(12) United States Patent
Ng et al.

(10) Patent No.: US 12,099,825 B2
(45) Date of Patent: Sep. 24, 2024

(54) SYSTEM AND METHOD FOR PERFORMING OVER-THE-AIR UPDATE

(71) Applicant: I/O Controls Corporation, Azusa, CA (US)

(72) Inventors: Gene Gim Tong Ng, Yorba Linda, CA (US); Mark Minghua Chan, Rancho Cucamonga, CA (US)

(73) Assignee: I/O Controls Corporation, Azusa, CA (US)

( * ) Notice: Subject to any disclaimer, the term of this patent is extended or adjusted under 35 U.S.C. 154(b) by 386 days.

(21) Appl. No.: 17/471,749

(22) Filed: Sep. 10, 2021

(65) Prior Publication Data

US 2023/0084842 A1    Mar. 16, 2023

(51) Int. Cl.
| | |
|---|---|
| *G06F 8/65* | (2018.01) |
| *G06F 21/44* | (2013.01) |
| *G07C 5/08* | (2006.01) |
| *H04L 29/08* | (2006.01) |
| *H04L 67/00* | (2022.01) |
| *H04L 67/06* | (2022.01) |
| *H04W 4/02* | (2018.01) |
| *H04W 4/20* | (2018.01) |
| *H04W 4/44* | (2018.01) |

(52) U.S. Cl.
CPC .............. *G06F 8/65* (2013.01); *G06F 21/44* (2013.01); *G07C 5/08* (2013.01); *H04L 67/06* (2013.01); *H04L 67/34* (2013.01); *H04W 4/023* (2013.01); *H04W 4/20* (2013.01); *H04W 4/44* (2018.02)

(58) Field of Classification Search
CPC .......... G06F 8/65; G06F 21/44; G06F 21/572; G07C 5/08; H04L 67/06; H04L 67/34; H04W 4/023; H04W 4/20; H04W 4/44; H04W 4/50
See application file for complete search history.

(56) References Cited

U.S. PATENT DOCUMENTS

2016/0371075 A1* 12/2016 Moeller .................. H04L 67/12

* cited by examiner

*Primary Examiner* — Brian P Sweeney
(74) *Attorney, Agent, or Firm* — Irell and Manella LLP

(57) ABSTRACT

A system for performing over-the-air (OTA) update is disclosed. The system may comprise a first communication interface, an electronic control subsystem of a vehicle, and a gateway. The gateway may be coupled to the electronic control subsystem by way of the first communication interface, receive trigger event information, and detect a trigger condition based on the trigger event information. The gateway may initiate, based on the detection of the trigger condition, a handshake with the electronic control subsystem, verify a set of parameters, and validate a version of a software or a firmware of at least one component of the electronic control subsystem. Based on the verification, the gateway may provide an update file to the electronic control subsystem by way of the first communication interface. The update file is configured to update the software or the firmware for the at least one component.

20 Claims, 8 Drawing Sheets

| Entire Fleet or Individual Vehicle* | Fleet ⌄ — 502a | | Fleet* | ABC Transit ⌄ — 502b | |
|---|---|---|---|---|---|
| Application File* | Choose File ABC_Transit.zip — 504 | | Event Time* | 06/30/2021 4:41 PM — 506 | |
| Remark: | OTA Update to Customer — 508 | | | | |

Upload — 510

| Vehicle | Status | Version | Event Time | Remark | Action |
|---|---|---|---|---|---|
| 1700 | Pending | v0.0.1 | 2021-01-08 11:00 | N/A | |
| 1700 | Pending | v0.0.5 | 2021-01-04 04:01 | N/A | |

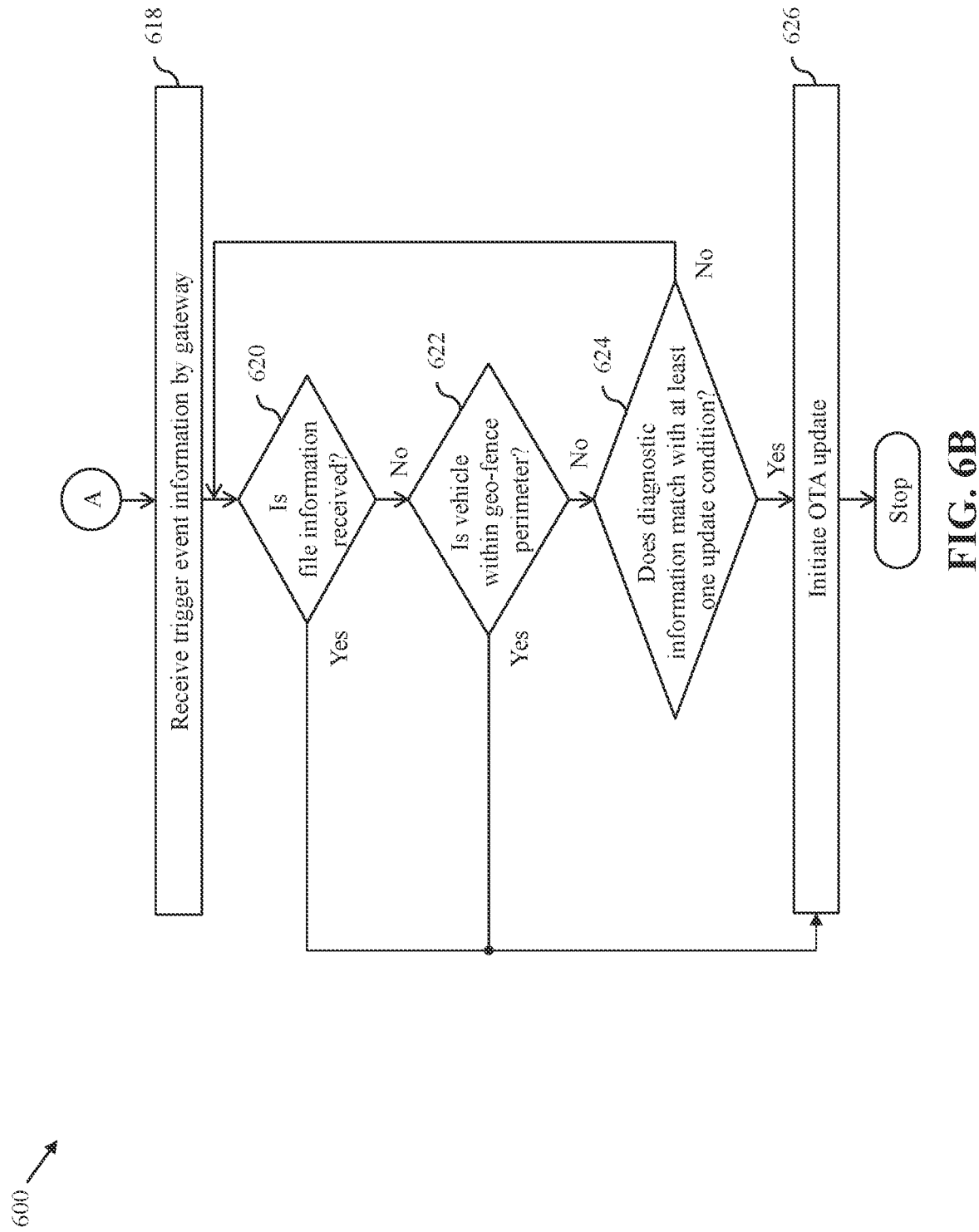

SYSTEM AND METHOD FOR PERFORMING OVER-THE-AIR UPDATE

TECHNICAL FIELD

The present disclosure relates generally to performing controlled updates of electronic systems, and, more particularly, to performing over-the-air (OTA) updates of at least one component of an electronic control subsystem of a vehicle.

BACKGROUND

Modern vehicles are equipped with various electronic control subsystems, e.g., including electronic control units (ECUs). These may be implemented by hardware components that are operated by or execute software and/or firmware. The software and/or firmware executed by the hardware components may be updated as new versions become available. Such updates may, for example, serve to improve subsystem functionality, security, and/or vehicle safety.

SUMMARY

In one embodiment, a system for performing OTS updates is disclosed. The system comprises a first communication interface, an electronic control subsystem of a vehicle, and a gateway. The electronic control subsystem is coupled to the first communication interface. The gateway coupled to the electronic control subsystem by way of the first communication interface, and configured to receive trigger event information, and detect a trigger condition based on the trigger event information. The gateway is further configured to initiate, based on the detection of the trigger condition, a handshake with the electronic control subsystem, and provide an update file to the electronic control subsystem by way of the first communication interface. The update file is configured to update a software or a firmware for at least one component of the electronic control subsystem.

In another embodiment, a method for performing OTA update is disclosed. The method includes receiving trigger event information at a gateway, and detecting a trigger condition based on the trigger event information. The method further includes initiating, based on the detection of the trigger condition, a handshake with an electronic control subsystem of a vehicle, and providing an update file to the electronic control subsystem by way of a first communication interface. The update file is configured to update a software or a firmware for at least one component of the electronic control subsystem.

In some examples, the gateway receives the trigger event information from at least one remote server.

In some examples, the gateway is further configured to receive the update file from the remote server.

In some examples, the trigger event information is received in response to a scheduled update request provided by a user device.

In some examples, the scheduled update request is provided to at least one remote server, causing the remote server to provide the trigger event information to the gateway.

In some examples, the scheduled update request includes at least one of a user identifier, a vehicle identifier, a file name, a predetermined time, and a user token.

In some examples, the at least one component of the electronic control subsystem is configured to provide an update status associated with the update of the software or the firmware to the gateway.

In some examples, the system further comprises a geofence system coupled to the gateway and configured to provide a current location of the vehicle. The detection of the trigger condition is based on a determination of whether the current location of the vehicle is within a predetermined area.

In some examples, the gateway is further configured to authenticate an access of the at least one component of the electronic control subsystem, and upon successful authentication, verify a set of parameters associated with the update of the software or the firmware for the at least one component.

In some examples, the gateway is further configured to retrieve a version of the firmware or the software of the at least one component, and validate the version of the firmware or the software of the at least one component.

In some examples, the set of parameters includes at least one of a protocol identifier, an origin, and a checksum of the update file.

In some examples, the system further comprises a second communication interface coupled to the gateway, and configured to provide diagnostic information to the gateway. The detection of the trigger condition is based on a determination of whether the diagnostic information matches at least one update condition.

The gateway and the communication interfaces are utilized to perform OTA update of the software or the firmware for at least one component of the electronic control subsystem. Thus, the OTA updates improve the functionality and security of the component of the electronic control subsystem.

BRIEF DESCRIPTION OF THE DRAWINGS

The illustrated embodiments of the subject matter will be best understood by reference to the drawings, wherein like parts are designated by like numerals throughout. The following description is intended only by way of example, and illustrates certain selected embodiments of devices, systems, and processes that are consistent with the subject matter as claimed herein.

FIG. 5 illustrates an example of a user interface rendered on a user device of the system of FIG. 1 in accordance with an embodiment of the present disclosure;

FIGS. 6A and 6B show an example of logic flow for detecting a trigger condition to initiate OTA update in accordance with an embodiment of the present disclosure.

DETAILED DESCRIPTION

Figure 1:
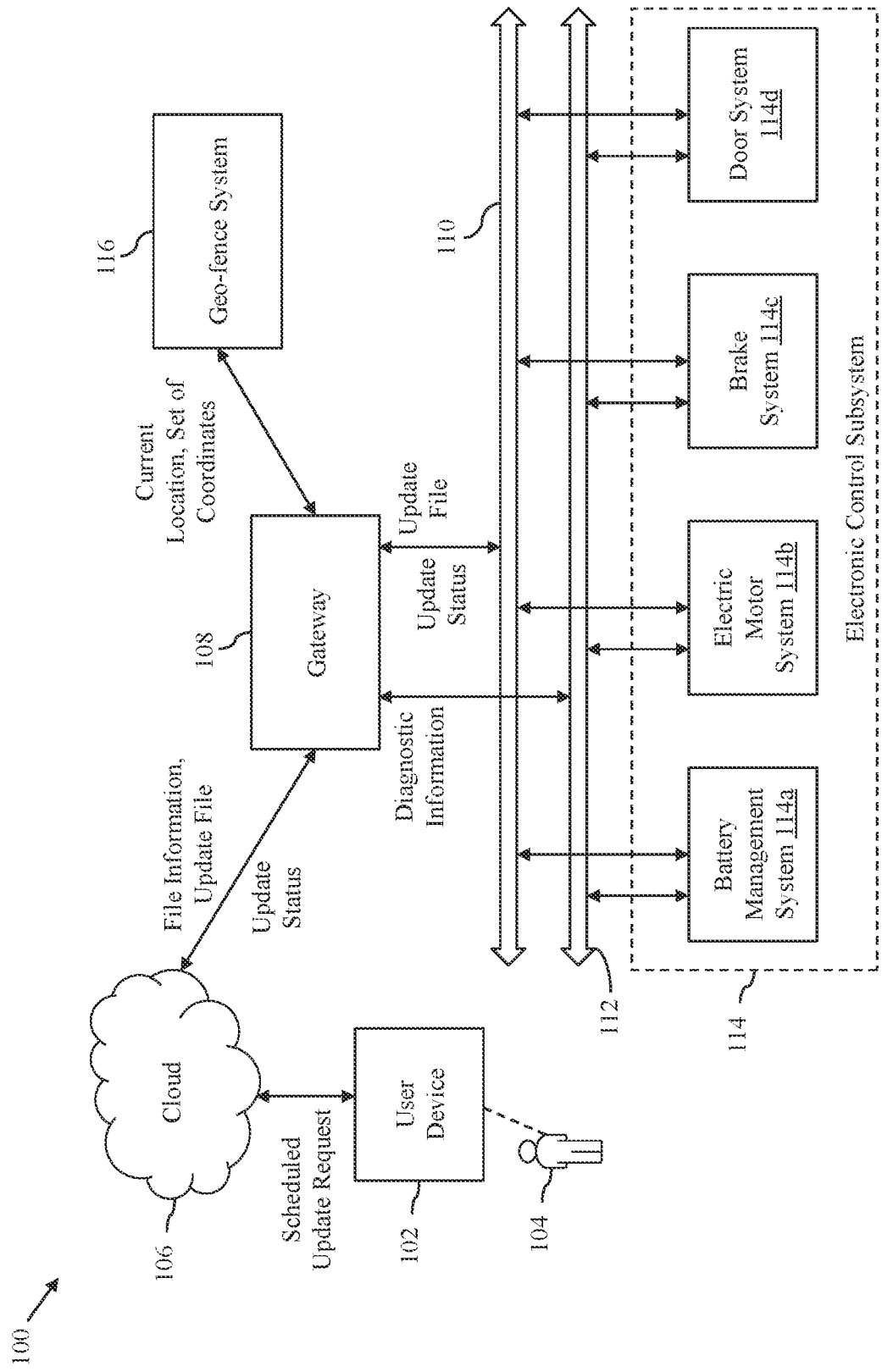
FIG. 1 is a block diagram of a system for performing OTA updates in accordance with an embodiment of the present disclosure.

Example apparatuses, methods and systems are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

FIG. 1 is a block diagram of a system 100 for performing over-the-air (OTA) updates in accordance with an exemplary embodiment of the disclosure. The system 100 may, in various implementations, include a user device 102 of a user 104, a cloud network 106 (also referred to as "cloud 106") comprising one or more remote servers, a gateway 108, a first communication interface 110, a second communication interface 112, an electronic control subsystem 114 of a vehicle (not shown), and a geo-fence system 116. The gateway 106 and the electronic control subsystem 114 may be coupled to each other via the first and/or second communication interfaces 110 and 112.

The user 104 may employ a user device 102, e.g., to schedule an OTA update for one or more components of the electronic control subsystem 114 of the vehicle. The OTA update may be scheduled, for example, by initiating a scheduled update request.

In various implementations, the user device 102 may include suitable logic, circuitry, interfaces, and/or code, executable by the circuitry, that may be configured to perform one or more operations, and may comprise a computer terminal, personal computer, laptop, smartphone, tablet computer, vehicle control system interface, and/or the like. For example, the user device 102 may be a computing device that is utilized, by the user 104, to initiate the one or more operations by means of a service application running on the user device 102. In some implementations, the OTA update may be scheduled via the service application running on the user device 102. In one implementation, a scheduled update request may comprise a JSON object taking a form similar to the following example:

```
{
    action: 'performOTA',
    userId:'gng',
    vehicleId:'A333',
    fileName:'abc_10.02.2343.ota',
    effectiveTime:'2021-08-24 15:32:32',
    userToken:'acd323af323f323423f323423'
}
```

The scheduled update request may include a predetermined time at which the OTA update is to be performed. The scheduled update request may further include other information, for example, at least one of a user identifier, a vehicle identifier, a file name, and a user token for the OTA update that are inputted by the user 104. Various modes of input that may be utilized by the user 104 to initiate the scheduled update request include, but are not limited to, a touch-based input, a text-based input, a voice-based input, a gesture-based input, or a combination thereof. Further, upon confirmation of the scheduled update request for the OTA update by the user 104, the user device 102 may be configured to transmit the schedule update request to the cloud 106. In another embodiment, the service application (running on the user device 102) may be configured to transmit the scheduled update request to the cloud 106.

In an embodiment, the user device 102 may be configured to receive, from the cloud 106, one or more user interfaces facilitating interaction of the user 104 with one or more computing devices, servers, or applications for performing the one or more operations. In some implementations, the selection of one or more user interfaces provided to the user device 102 may depend on a variety of factors, such as the particular update and/or electronic control subsystem being updated, user role and/or authorization, location, time, and/or the like, and may be received for initiating the scheduled update request by the user 104. Further, the user device 102 may be utilized, by the user 104, to view the one or more user interfaces rendered by the cloud 106. The user 104 may interact with each user interface to provide one or more inputs for initiating the scheduled update request. For example, the user device 102 may be utilized, by the user 104, to provide an input to select a file for the OTA update. In another example, the user device 102 may be utilized, by the user 104, to provide an input for the predetermined time at which the OTA update is to be performed. In other examples, the user 104 may interact with each user interface to provide any other information to facilitate the OTA update.

In an embodiment, the user device 102 may be configured to receive an update status from the cloud 106 based on the OTA update of the at least one component of the electronic control subsystem 114. The user device 102 may be further utilized, by the user 104, to view a status of the OTA update (e.g., in progress, complete, pending authorization or further input, and/or the like).

In various implementations, the cloud 106 may comprise a public, private, and/or hybrid cloud system/network. For example, the cloud 106 may include a plurality of resources (not shown) such as one or more remote servers in communication with each other. The plurality of resources may further include firewalls, load balancers, WAN optimization platform(s), device(s), virtual machine(s) (VMs), and/or the like. The plurality of resources may be a combination of physical and/or virtual resources. The plurality of resources may be provisioned based on requests, such as the scheduled update request, from one or more clients. The clients may be one or more user devices, for example the user device 102, or one or more servers. Various entities in the system 100 may connect to the cloud 106 in accordance with various wired and wireless communication protocols, such as Transmission Control Protocol and Internet Protocol (TCP/IP), User Datagram Protocol (UDP), Long Term Evolution (LTE) communication protocols, or any combination thereof Each remote server of the cloud 106 may include suitable logic, circuitry, interfaces, and/or code, executable by the circuitry, that may be configured to perform one or more operations, such as receiving, storing, processing, and transmitting queries, data, or content. Each remote server may be a data management and storage computing device, such that at least one remote server is communicatively coupled to the user device 102 and the gateway 108, or two different remote servers that are in communication with each other are communicatively coupled to the user device 102 and the gateway 108, respectively, to perform the one or more operations. In an exemplary embodiment, at least one remote server may be configured to manage and store historical scheduled update requests from various users, such as the user 104. The scheduled update requests of each user (such as the user 104) may include vehicle details (e.g., vehicle identifier and/or vehicle identification number

[VIN], vehicle type, update information, user identifier and/or authorization credentials, and/or the like) associated with the OTA update by each user in the past. In an exemplary embodiment, the historical scheduled update requests of each user may include at least the vehicle details, verification information, authorization code, an update status, a firmware version, a current and/or scheduled time, location, and/or the like. In one implementation, the historical scheduled update request may comprise a JSON object taking a form similar to the following example:

```
{
    action:'ota',
    vehicleVer:'10.11.0004',
    latestVer:'10.12.0005"
    authCode:'acd334cf323434"
    keyFile:'iokeyfile.key"
    devId:'abcd2332df3#@',
    location:{lat:33.343332,lon:-134.234234},
}
```

The at least one remote server may be configured to receive the historical scheduled update requests of the users (such as the user 104) from the user devices (such as the user device 102), or the gateway 108.

The at least one remote server may be further configured to manage and store an update file and file information associated with the update file to be utilized for performing the OTA update. The update file is configured to update software and/or firmware for at least one component of the electronic control subsystem 114. In some implementations, the file information associated with the update file may include, e.g., a version of the update file, a current version of firmware/software on the vehicle, an authentication code, a file identifier, a location of the vehicle, and/or the like. In one embodiment, the file information may be generated based on the scheduled update request and the update file. A primary code associated with the update file is stored in the gateway 108 or the cloud 106. The primary code is executed by the gateway 108 to perform the OTA update. If the update file is uniform resource locator (URL) encoded, on execution of the primary code the URL encoded update file may be converted to a local file for updating the software/firmware of the at least one component of the electronic control subsystem 114. In one example, the primary code may be written in one or more languages such as Python, Perl, and JavaScript.

In an embodiment, the at least one remote server may be configured to provide the file information as trigger event information along with the update file to the gateway 108 on receiving the scheduled update request from the user 104 via the user device 102. The at least one remote server may also or alternatively receive trigger event information from one or more other remote servers, data feeds, and/or the like, and/or may generate trigger event information, such as based on the scheduled update request received from the user 104. Examples of the remote servers may include, but are not limited to, a personal computer, a laptop, or a network of computer systems.

The gateway 108 may include suitable logic, circuitry, interfaces, and/or code, executable by the circuitry, that may be configured to perform one or more operations for performing the OTA update. The gateway 108 may be a computing device, which may include a software framework, that may be configured to create the gateway implementation and perform the various operations associated with the OTA update. In some implementations, the gateway 108 may be realized through various web-based technologies, such as, but not limited to, a Java web-framework, a .NET framework, a PHP framework, a python framework, and/or any other web-application framework. Examples of the gateway 108 include, but are not limited to, a personal computer, a laptop, or a network of computer systems.

In an embodiment, the gateway 108 may be configured to process, control, and manage various functionalities and operations such as trigger condition detection, authentication, parameter verification, version validation, OTA updating, user interface generation, and/or the like. For example, the gateway 108 may be configured to receive trigger event information from at least one remote server of the cloud 106. Based on the received trigger information, the gateway 108 may be configured to detect the occurrence or non-occurrence of a trigger condition for the OTA update. In various implementations, trigger conditions for triggering OTA updates may include, but are not limited to, a GPS location of a vehicle and/or breaching of a geo-fence perimeter, residency therein for a period of time, and/or the like; multiplex control logic (e.g., J1939 condition, DINEX inputs and outputs, and/or the like); manual operations (e.g., vehicles switches or controls, USB connections, key fobs, and/or the like); and/or the like. Based on the detected trigger condition, the gateway 108 may be configured to initiate a handshake with the electronic control subsystem 114. Further, the gateway 108 may be configured to authenticate an access of at least one component of the electronic control subsystem 114 for performing the OTA update. Upon successful authentication, the gateway 108 may be further configured to verify a set of parameters, such as a protocol identifier, associated with the at least one component of the electronic control subsystem 114. In an embodiment, the gateway 108 may be configured to retrieve and validate a current firmware/software version of the at least one component, verify an origin, file name, file format, checksum of the update file, and/or the like. In some examples, an origin of the file may include, but is not limited to, a file server, block chain, file creator, file modified, and/or the like.

Upon successful validation, the gateway 108 may be further configured to perform the OTA update of the at least one component, e.g., by executing the primary code. In an embodiment, the gateway 108 may be further configured to retrieve the update status from the at least one component, and generate and render the one or more user interfaces on the user device 102, e.g., via the service application running on the user device 102. For example, the gateway 108 may render a first user interface on the user device 102 via the cloud 106. The first user interface may present the update status to the user 104. Various operations and functionalities of the gateway 108 have been described in detail in conjunction with FIGS. 2-5.

The electronic control subsystem 114 of the vehicle may include a plurality of components, e.g., electronic control units (ECUs), that control various subsystems of the vehicle. In one embodiment, the electronic control subsystem 114 may comprise a battery management system (BMS) 114a, an electric motor system 114b, a brake system 114c, a door system 114d, and/or the like. The scope of the present disclosure is not limited to these, and in various other embodiments, the electronic control subsystem 114 may include various components in addition to or instead of the aforementioned examples, such as an HVAC system, a drive system, and/or the like, that control various subsystems of the vehicle. Each component of the electronic control subsystem 114, e.g., the BMS 114a, the electric motor system 114b, the brake system 114c, the door system 114d, and/or the like, may be operably coupled to the gateway 108 by way of the first and second communication interfaces 110 and 112.

The BMS 114a may include suitable logic, circuitry, interfaces, and/or codes, executable by the circuitry, that may be configured to perform one or more operations associated with battery management of the vehicle. For example, the BMS 114a may be configured to determine a charging status and/or an energy status of a battery of the vehicle. The charging status may be include, e.g., "charging", "discharging", "completely charged", "completely discharged," and/or the like. The energy status may indicate an amount of energy remaining in the battery. In one example, the energy status may indicate the amount of energy remaining in percentage, such as "50%". The BMS 114a may further be configured to provide the charging status and the energy status to the gateway 108, such as by way of the first communication interface 110 and/or second communication interface 112.

The electric motor system 114b may include suitable logic, circuitry, interfaces, and/or codes, executable by the circuitry, that may be configured to perform one or more operations associated with a motor of the vehicle. For example, the electric motor system 114b may be configured to determine a motor status of the motor and/or provide the motor status to the gateway 108, such as by way of the first communication interface 110 and/or the second communication interface 112. The motor status may indicate, e.g., a motor rotation number of the motor, condition of the motor, and/or the like. In one example, the motor status is indicated by rotations per minute (rpm), such as "1000 rpm."

The brake system 114c may include suitable logic, circuitry, interfaces, and/or codes, executable by the circuitry, that may be configured to perform one or more operations associated with a brake of the vehicle. For example, the brake system 114c may be configured to determine an on/off status, condition, and/or the like of the brake and provide such information to the gateway 108, such as by way of the first communication interface 110 and/or the second communication interface 112. The on/off status and/or condition may indicate, e.g., whether antilock braking system is operational or not.

The door system 114d may include suitable logic, circuitry, interfaces, and/or codes, executable by the circuitry, that may be configured to perform one or more operations associated with doors of the vehicle. For example, the door system 114d may be configured to determine a door status of each door of the vehicle and provide the door status to the gateway 108 by way of the first communication interface 110. The door status may indicate, e.g., whether corresponding door is open or closed.

In some implementations, the first communication interface 110 may comprise and/or utilize a control area network (CAN), such as a J1939 bus, where J1939 refers to a vehicle data bus standard defined by the Society of Automotive Engineers (SAE) for communication and diagnostics. The first communication interface 110 may further be configured to facilitate communication between the gateway 108 and the electronic control subsystem 114 and/or components thereof, e.g., for transfer of data, instructions, software and/or firmware updates, and/or the like, such as the charging status, the energy status, the motor status, the on/off status, the door status, a vehicle speed, and/or the like. In some implementations, a second communication interface 112 may also be utilized. The second communication interface 112 may, for example, comprise and/or utilize a CAN, such as a DINEX CAN. The second communication interface 112 may be configured to facilitate communication between the gateway 108 and the electronic control subsystem 114 and/or components thereof, e.g., for transfer of data, instructions, software and/or firmware updates, and/or the like, such as diagnostic information that includes vehicle fault codes, indicator flags, and/or the like. In various implementations, the disclosed systems and methods may utilize and/or operate in conjunction with other communication interfaces, such as but not limited to: universal serial bus (USB), serial, RS485, Ethernet, and/or the like. The vehicle fault codes may be indicative of a fault in any of the components of the electronic control subsystem 114, such as a battery fault, a motor fault, an anti-lock braking system fault, and/or the like. The indicator flags may be indicative of certain conditions such as low battery, door open, and/or the like. In some implementations, the second communication interface 112 may be configured to provide the diagnostic information as trigger event information to the gateway 108.

A geo-fence system 116 may include suitable logic, circuitry, interfaces, and/or codes, executable by the circuitry, that may be configured to perform one or more operations. For example, in some implementations, the geo-fence system 116 may be configured to detect, record, store, and/or predict a current location of a vehicle, such as based on information obtained from a sensor system, such as a global positioning system (GPS). The geo-fence system 116 may further be configured to store a set of co-ordinates associated with a predetermined area, e.g., a geo-fence perimeter. The geo-fence system 116 may be coupled, directly or indirectly, with the gateway 108, and configured to provide a current, past, and/or future location of the vehicle and associated set of co-ordinates, which may act as part of trigger event information, to the gateway 108. In one implementation, the geo-fence system 116 may provide a vehicle location and/or associated set of co-ordinates as a JSON object having a form similar to the following example:

```
{
    location:{lat:33.343332,lon:-134.234234},
    geoarea:
    [{lat:33.343332,lon:-134.234234},{lat:33.364332,lon:-134.234634},{lat:33.347
    332,lon:-134.234134},{lat:33.303332,lon:-134.200234},{lat:33.313032,lon:-13
    4.258234}]
}
```

In operation, the gateway 108 may be configured to receive the trigger event information. Based on the trigger event information, the gateway 108 may further be configured to detect the occurrence or non-occurrence of a trigger condition.

In one embodiment, the user 104 schedules the OTA update for at least one component of the electronic control subsystem 114, e.g., at a predetermined or non-predetermined time and/or location, range of times and/or locations, and/or the like, by utilizing the user device 102, generating a scheduled update request. The user device 102 provides the scheduled update request to the at least one remote server. In one implementation, following receipt of the schedule update request, the at least one remote server may provide file information, e.g., as the trigger event information, along with the update file to the gateway 108. In one implementation, the at least one remote server may provide the trigger event information to the gateway 108 at a predetermined time, vehicle location, and/or the like. The gateway 108 is configured to determine whether the file information along with the update file is received from the at least one remote server. In this embodiment, the detection of the trigger condition may be based, at least in part, on the determination of whether the file information along with the update file is received from the at least one remote server. E.g., when the update file along with the file information is received by the gateway 108, the trigger condition is satisfied.

In another embodiment, the geo-fence system 116 may detect a current location of the vehicle and provide the current location and/or set of co-ordinates, e.g., as trigger event information, to the gateway 108. Based on the trigger event information (e.g., the current location of the vehicle and/or set of co-ordinates), the gateway 108 may determine whether the current location of the vehicle is within a geo-fence perimeter. In this embodiment, the detection of the trigger condition may be based, at least in part, on a determination of whether the current location of the vehicle is within the geo-fence perimeter. E.g., when the current location of the vehicle is within the geo-fence perimeter, the trigger condition is satisfied.

In yet another embodiment, the second communication interface 112 provides diagnostic information, e.g., as the trigger event information to the gateway 108. Following receipt of the diagnostic information, the gateway 108, may be configured to determine whether the diagnostic information matches and/or satisfies at least one update condition. For example, when the vehicle fault codes of the diagnostic information indicate a fault in any of the components of the electronic control subsystem 114, the at least one update condition may be satisfied. In this embodiment, the detection of the trigger condition may be based on a determination of whether the diagnostic information matches at least one update condition. E.g., when the diagnostic information matches at least one update condition, the trigger condition is satisfied.

The scope of the present disclosure is not limited to the aforementioned trigger conditions, and in various other embodiments various trigger conditions may be provided, detected, evaluated, and/or the like based on the trigger event information, without deviating from the scope of the present disclosure.

Following the detection of the trigger condition (e.g., when any one of the aforementioned the trigger condition is satisfied), the gateway 108 may initiate a handshake with the electronic control subsystem 114. The gateway 108 may further be configured to authenticate an access to the at least one component of the electronic control subsystem 114. In one embodiment, the authentication may be performed based on an authentication code, login or password, user credential, biometric information, vehicle information, and/or the like provided by the user device and/or at least one remote server, and/or included in the file information. Upon successful authentication (e.g., upon grant of the access to the at least one component), the gateway 108 may further be configured to verify a set of parameters associated with the update of the software or firmware for the at least one component. In some implementations, the set of parameters may include, e.g., a protocol identifier, an origin, and/or a checksum of the update file, and/or the like.

In some implementations, the gateway 108 may be configured to retrieve and/or validate a current version and/or update file version of the firmware or the software of the at least one component. An authenticity of the update file may be validated by verifying the origin and/or the checksum of the update file based on the file information. When the origin and/or the checksum of the update file are verified, the gateway 108 may proceed to perform the OTA update of the at least one component, e.g., by executing the primary code. Based on the execution of the primary code, the gateway 108 may provide the update file to the at least one component of the electronic control subsystem 114, e.g., by way of the first communication interface 110 and/or the second communication interface 112, for updating the firmware and/or the software of the at least one component. In one implementation, the update file and/or instructions to perform the OTA update may comprise a JSON object having a form similar to the following example:

```
{
  action: 'performOTA',
  subsystemId:'B2'
  fileName:'abc_10.02.2343.ota',
  otaSeq:{ code:'
    def updateIOFirmware(self, firmware_file: Union[sti, QUrl]) -> None:
    # the file path could be url-encoded.
    if firmware_file.startswith("io"):
       self._firmware_file = QUrl(firmware_file).toLocalFile( )
    else:
       self._firmware_file = firmware_file
    if self._firmware_file == "":
       self._setFirmwareUpdateState(FirmwareUpdateState.firmware_not_fo
  und_error)
       return
    self._initFirmwareState(FirmwareUpdateState.updating)
    try:
       self._update_firmware_thread.start( )
    except RuntimeError:
  ',
  retry:3,
  },
}
```

In one implementation, the gateway 108 may further be configured to retrieve the update status from the at least one component and/or provide the update status to the cloud 106. In one implementation, the gateway 108 may further be configured to generate a user interface such as may indicate the update status, and may render the user interface indicating the update status on the user device 102 by way of the cloud 106.

Figure 2:
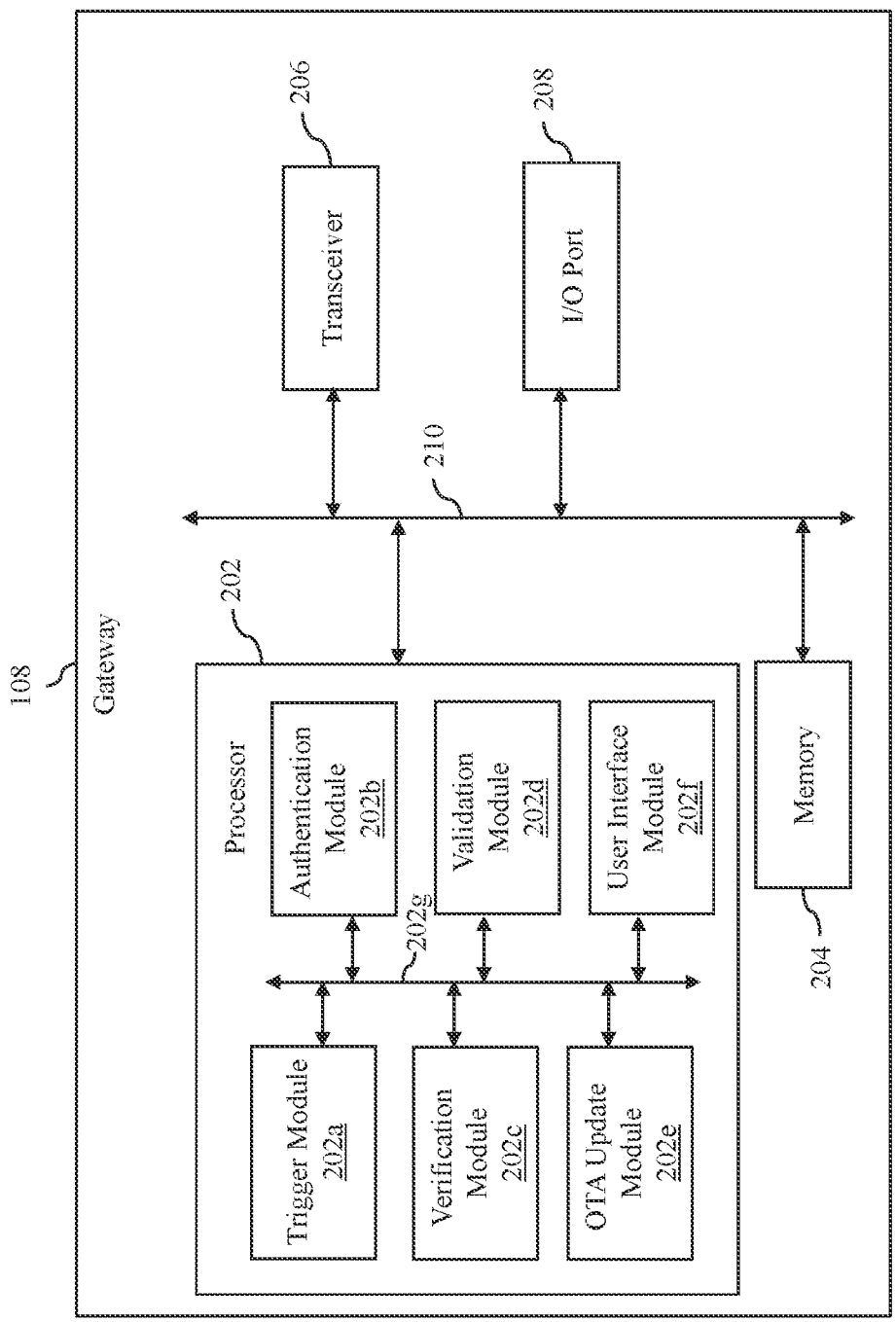
FIG. 2 is a block diagram of a gateway of the system of FIG. 1 in accordance with an embodiment of the present disclosure.

FIG. 2 is a block diagram of the gateway 108 in accordance with an embodiment of the present disclosure. The gateway 108 may include circuitry such as a processor 202, a memory 204, a transceiver 206, an input/output (I/O) port 208, and/or the like that communicate with each other by way of a first communication bus 210.

The processor 202 may include suitable logic, circuitry, interfaces, and/or codes, executable by the circuitry, that may be configured to perform the one or more operations for performing the OTA update. For example, the processor 202 may be configured to control and manage various operations such as trigger condition detection, authentication, parameter verification, file validation, OTA updating, user interface generation, and/or the like. The various operations may be controlled and managed by means of one or more internal components of the processor 202, such as a trigger module 202a, an authentication module 202b, a verification module 202c, a validation module 202d, an OTA update module 202e, a user interface module 202f, and/or the like, such as may communicate with each other by way of a second communication bus 202g.

In one implementation of the processor 202, the trigger module 202a, the authentication module 202b, the verification module 202c, the validation module 202d, the OTA update module 202e, and/or the user interface module 202f may operate as slave processing units. In this implementation, the processor 202 may be configured to instruct the trigger module 202a, the authentication module 202b, the verification module 202c, the validation module 202d, the OTA update module 202e, and/or the user interface module 202f to perform their corresponding operations either independently or in conjunction with each other. Examples of the processor 202 include, but are not limited to, an application-specific integrated circuit (ASIC) processor, a reduced instruction set computing (RISC) processor, a complex instruction set computing (CISC) processor, and/or the like. In various implementations, the processor 202 may be compatible with multiple operating systems.

The trigger module 202a may include suitable logic, circuitry, interfaces, and/or codes, executable by the circuitry, that may be configured, e.g., to perform the one or more operations for detecting the trigger condition. For example, the trigger module 202a may be configured to receive the trigger event information. The trigger module 202a may be further configured to detect the trigger condition based on the trigger event information. The trigger module 202a may be configured to process the trigger event information (such as the file information, the current location of the vehicle and/or associated set of co-ordinates, the diagnostic information, and/or the like) to detect the trigger condition. Further, the trigger module 202a may be configured to initiate a handshake with the electronic control subsystem 114, such as based on the detection of the trigger condition.

The authentication module 202b may include suitable logic, circuitry, interfaces, and/or codes, executable by the circuitry, that may be configured, e.g., to perform the one or more operations for authenticating an access to at least one component of the electronic control subsystem 114. In one implementation, the authentication may be performed based on the authentication code of the file information, user role or credentials, and/or the like.

The verification module 202c may include suitable logic, circuitry, interfaces, and/or codes, executable by the circuitry, that may be configured, e.g., to perform one or more operations for verifying the set of parameters. For example, upon successful authentication by the authentication module 202b, the verification module 202c may further be configured to verify the set of parameters, such as the protocol identifier, the origin, the checksum of the update file, and/or the like, associated with the update of the software or firmware for the at least one component.

The validation module 202d may include suitable logic, circuitry, interfaces, and/or codes, executable by the circuitry, that may be configured, e.g., to perform the one or more operations for validation of the current software and/or firmware. In one implementation, the validation module 202d may be configured to retrieve the current version of the firmware or the software of the at least one component, and validate the current version of the firmware and/or the software of the at least one component.

The OTA update module 202e may include suitable logic, circuitry, interfaces, and/or codes, executable by the circuitry, that may be configured, e.g., to perform one or more operations for performing the OTA update. For example, the OTA update module 202e may be configured to perform the OTA update of the at least one component, such as by executing the primary code. In one implementation, primary code may comprise Python, Java, Javascript, and/or the like source code and/or may be dynamically pushed onto the gateway 108 from the cloud 106. In one implementation, the primary code may comprise scripting code taking a form similar to the following example:

```
def updateIOFirmware(self, firmware_file: Union[str,
QUrl]) -> None:
# the file path could be url-encoded.
if firmware_file.startswith("io"):
self._firmware_file =
QUrl(firmware_file).toLocalFile( )
else:
self._firmware_file = firmware_file
if self._firmware_file == "":
self._setFirmwareUpdateState(FirmwareUpdateState.fir
mware_not_found_error)
return
self._initFirmwareState(FirmwareUpdateState.updating)
try:
self._update_firmware_thread.start( )
except RuntimeError:
```

Based on the execution of the primary code, the OTA update module 202e may be configured to provide the update file to the at least one component of the electronic control subsystem 114, such as by way of the first communication interface 110 and/or the second communication interface 112, for updating the firmware and/or the software for the at least one component. The OTA update module 202e may further be configured to retrieve the update status from the at least one component, provide the update status to the cloud 106 and/or user device 102, and/or the like.

The user interface module 202f may include suitable logic, circuitry, interfaces, and/or codes, executable by the circuitry, that may be configured, e.g., to perform one or more operations for generating user interfaces. The user interface module 202f may be configured to generate a user interface (e.g., as shown in FIG. 5) and/or to render the user interface on the user device 102, such as by way of the cloud 106. In one implementation, user 104 may schedule the OTA update by interacting with the rendered user interface. In one implementation, the user interface module 202f may be configured to generate and/or render a user interface indicating the update status on the user device 102.

The memory 204 may include suitable logic, circuitry, interfaces, and/or codes, executable by the circuitry, that may be configured, e.g., to store one or more instructions that are executed by the processor 202 to perform the various operations. For example, the memory 204 may be configured to temporarily or persistently store the file information, the current location of the vehicle, the diagnostic information, the update file, the set of co-ordinates of the geo-fence perimeter, the update status associated with each OTA update, and/or the like. Examples of the memory 204 include, but are not limited to, a random-access memory (RAM), a read-only memory (ROM), a programmable ROM (PROM), an erasable PROM (EPROM), and/or the like.

The transceiver 206 may include suitable logic, circuitry, interfaces, and/or codes, executable by the circuitry, that may be configured, e.g., to transmit (or receive) data to (or from) various servers or devices, such as the remoter server of the cloud 106, the electronic control subsystem 114, the geo-fence system 116, and/or the like. Examples of the transceiver 206 may include, but are not limited to, an antenna, a radio frequency transceiver, a wireless transceiver, a Bluetooth transceiver, and/or the like. In various implementations, the transceiver 206 may be configured to communicate with the remoter server of the cloud 106, the electronic control subsystem 114, the geo-fence system 116, and/or the like using various wired and wireless communication protocols, such as TCP/IP, UDP, LTE communication protocols, or any combination thereof The I/O port 208 may include suitable logic, circuitry, interfaces, and/or codes, executable by the circuitry, input and output devices, and/or the like that are configured to communicate with the processor 202.

Figure 3:
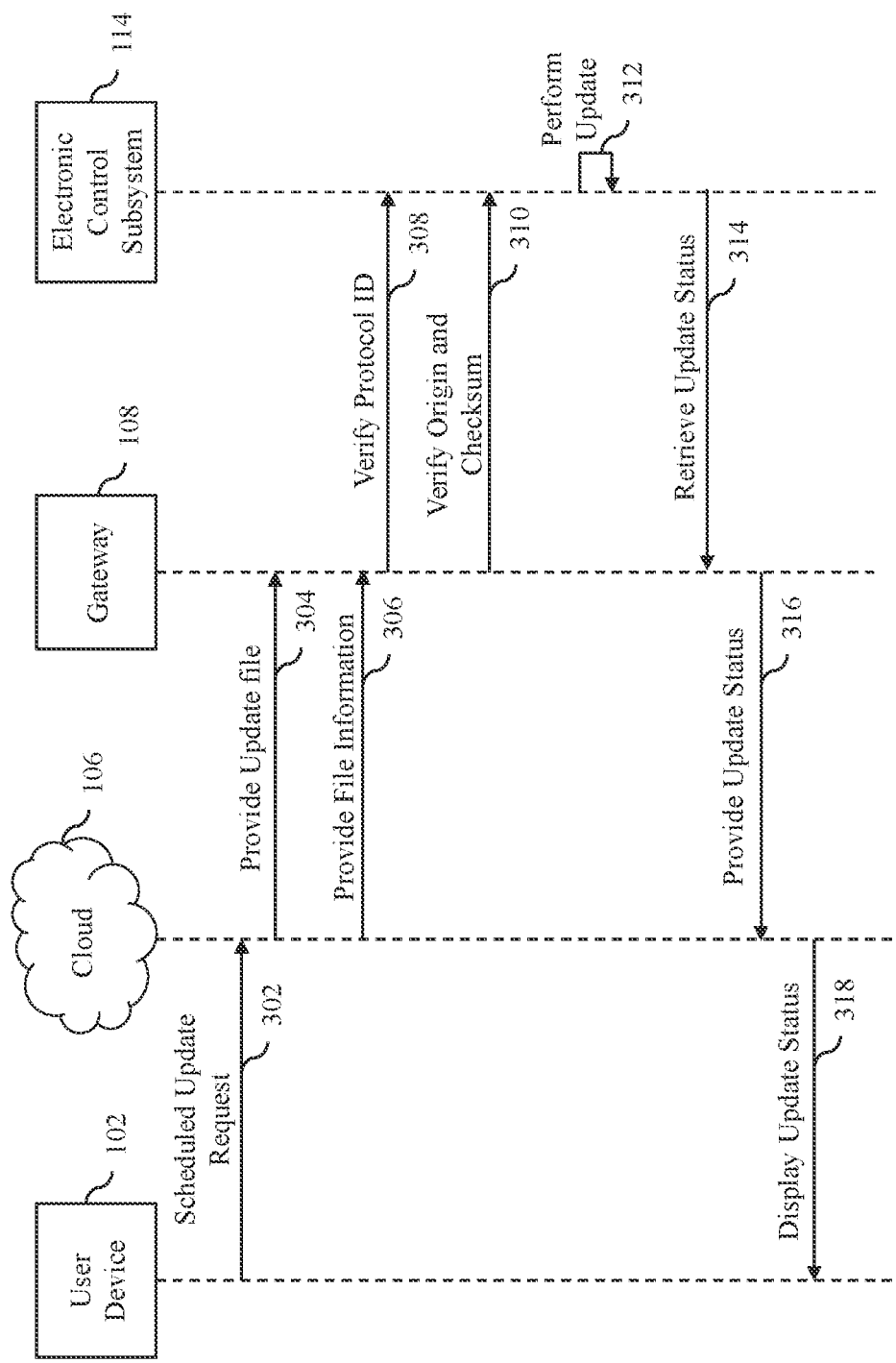
FIG. 3 is a data flow diagram of an exemplary OTA update process in accordance with an embodiment of the present disclosure.

FIG. 3 a data flow diagram 300 of an exemplary OTA update process in accordance with an embodiment of the present disclosure. The data flow diagram 300 includes the user device 102, the cloud 106, the gateway 108, and the electronic control subsystem 114.

In the illustrated implementation, the user 104 schedules the OTA update for at least one component of the electronic control subsystem 114, such as at a predetermined time, by utilizing the user device 102, thereby generating the scheduled update request. The user device 102 provides the scheduled update request to the at least one remote server of the cloud 106 (as shown by arrow 302). Following receipt of the scheduled update request 302, the at least one remote server of the cloud 106 may provide file information 306, e.g., as the trigger event information along, with the update file 304 to the gateway 108. In one implementation, the at least one remote server may provide the trigger event information to the gateway 108 following a predetermined duration and/or at a predetermined time. In one implementation, the gateway 108 may evaluate whether the file information and/or the update file is received from the at least one remote server, to determine whether the trigger condition is satisfied.

Based on the detection of the trigger condition, the gateway 108 may initiate a handshake with the electronic control subsystem 114. The gateway 108 may authenticate the access to the at least one component of the electronic control subsystem 114. Upon successful authentication, the gateway 108 may verify the protocol identifier 308 associated with the update of the at least one component. The gateway 108 may further verify the origin and/or the checksum of the update file (as shown by arrow 310). The gateway 108 may further validate the current version of the firmware and/or the software of the at least one component.

Following verification of the origin and/or the checksum of the update file, the gateway 108 may be configured to perform the OTA update of the at least one component, such as by executing an primary code. Based on the execution of the primary code, the gateway 108 may be configured to provide the update file to the at least one component of the electronic control subsystem 114, e.g., by way of the first communication interface 110 and/or the second communication interface 112. Thus, the firmware and/or the software of the at least one component is updated (as shown by arrow 312). The gateway 108 may further be configured to retrieve an update status, e.g., from the at least one component (as shown by arrow 314), provide the update status to the cloud 106 (as shown by arrow 316), and/or the like. In one embodiment, the gateway 108 may further be configured to generate a user interface that indicates the update status and/or render the user interface indicating the update status on the user device 102, such as by way of the cloud 106 (as shown by arrow 318).

Figure 4:
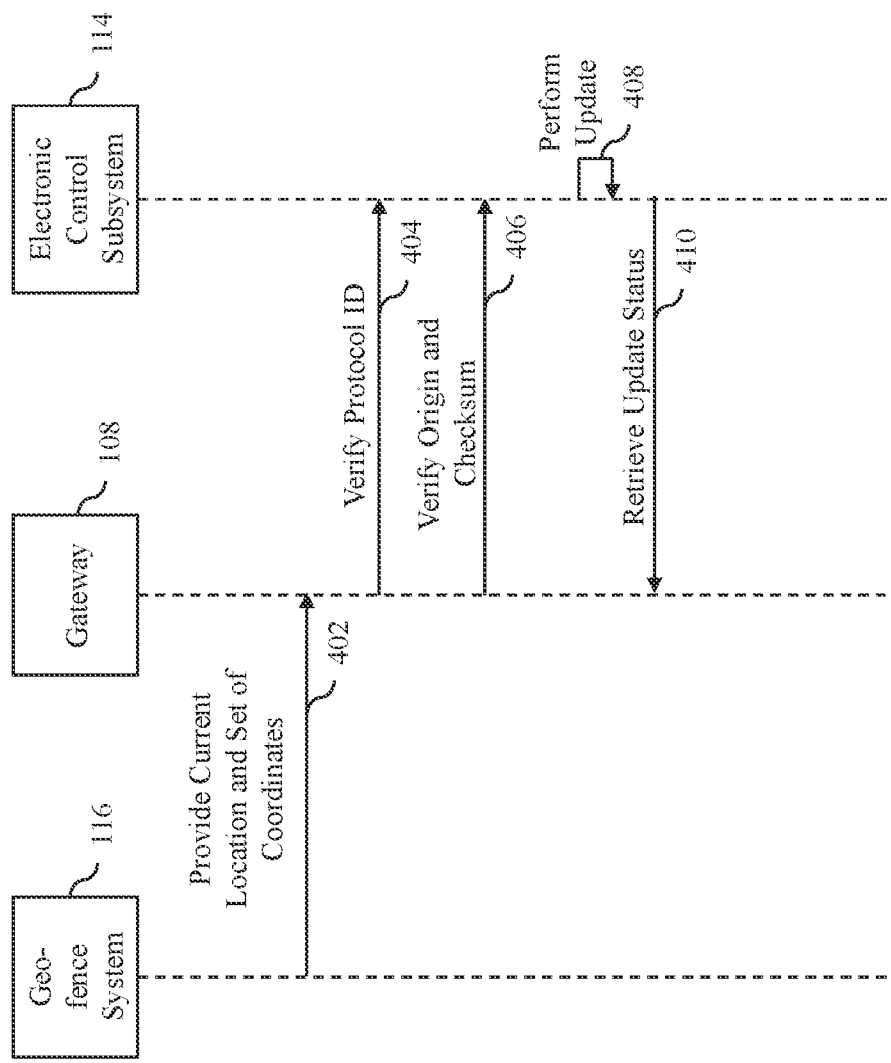
FIG. 4 is a data flow diagram of another exemplary OTA update process in accordance with an embodiment of the present disclosure.

FIG. 4 is a data flow diagram 400 of another exemplary OTA update process in accordance with an embodiment of the present disclosure. The data flow diagram 400 includes the geo-fence system 116, the gateway 108, and the electronic control subsystem 114.

In the illustrated embodiment, the geo-fence system 116 may detect a current location of the vehicle and/or provide the current location and/or associated set of co-ordinates, e.g., as trigger event information, to the gateway 108 (as shown by arrow 402). Following receipt of the trigger event information, e.g., the current location of the vehicle and/or associated set of co-ordinates, the gateway 108 may determine whether the current location of the vehicle is within a geo-fence perimeter, such as to detect whether a trigger condition is satisfied.

Based on detection of the trigger condition, the gateway 108 may initiate a handshake with the electronic control subsystem 114. The gateway 108 may authenticate the access to the at least one component of the electronic control subsystem 114. Following successful authentication, the gateway 108 may verify a protocol identifier associated with the update of the at least one component (as shown by arrow 404). The gateway 108 may further verify the origin and/or the checksum of the update file (as shown by arrow 406). The gateway 108 may further validate a current version of the firmware and/or the software of the at least one component.

Following verification of the origin and/or the checksum of the update file, the gateway 108 may be configured to initiate and/or perform the OTA update of the at least one component, e.g., by executing the primary code. Based on the execution of the primary code, the gateway 108 may be configured to provide the update file to the at least one component of the electronic control subsystem 114, such as by way of the first communication interface 110 and/or the second communication interface 112, for updating the firmware and/or the software for the at least one component. Thus, the firmware or the software of the at least one component is updated (as shown by arrow 408). The gateway 108 may further be configured to retrieve an update status from the at least one component (as shown by arrow 410).

FIG. 5 illustrates an example of a user interface 500 rendered on the user device 102 in accordance with an exemplary embodiment of the disclosure. In one implementation, the gateway 108 may be configured to render the user interface 500 on the user device 102 of the user 104. The user interface 500 may be utilized by the user 104, e.g., to schedule an OTA update.

The user interface 500 may include dropdown lists 502a and 502b that are selectable by the user 104, e.g., to provide vehicle details for which the OTA update is to be scheduled. In one embodiment, the dropdown list 502a allows the user 104 to select whether the OTA update is to be scheduled for an individual vehicle, more than one vehicle, a fleet of vehicles, a class of vehicles, and/or the like. For example, if the user selects that the OTA update is to be scheduled for a fleet or class of vehicles in the dropdown list 502a, the dropdown list 502b allows the user to select a particular fleet or class of vehicles from among a group of fleets or classes. The user interface 500 may further include an option 504 that allows the user to select a file for the OTA update, such as the update file, and/or an input box to input a time, date, range thereof, and/or the like at which the OTA update is to be scheduled. Further, the illustrated user interface 500 may include a text box 508 to receive information associated with the scheduling of the OTA update, and/or an upload button 510 to generate the scheduled update request. After providing the vehicle details, selecting the update file, inputting the time information, and/or the like, the user 104 may click on the upload button 510 to instruct the user device 102 to generate the scheduled update request. The user interface 500 may further include a table 512 that presents information associated with historical scheduled update requests, such as vehicle information, update statuses, versions, scheduled times, versions, remarks, actions, and/or the like for some or all prior scheduled update requests.

Figure 6A:
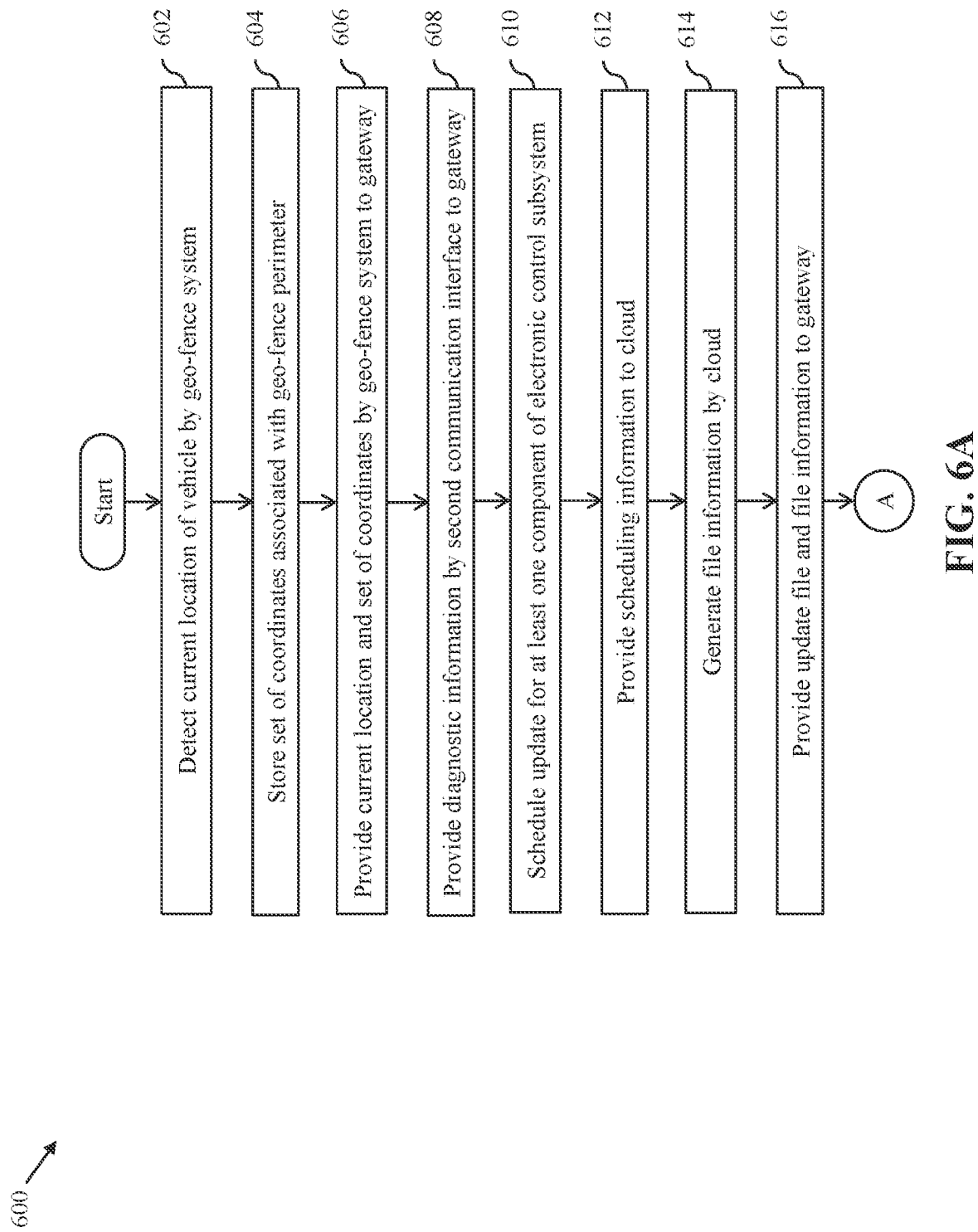

FIGS. 6A and 6B show an example of logic flow 600 for detecting the trigger condition to initiate the OTA update in accordance with an embodiment of the present disclosure.

In the illustrated embodiment, the geo-fence system 116 detects the current location of the vehicle 602. The geo-fence system 116 may further store a set of co-ordinates associated with the geo-fence perimeter 604. In an alternative implementation, the co-ordinates associated with the geo-fence perimeter may be stored by the gateway 108 and/or by one or more remote servers in the cloud 106.

The geo-fence system 116 may provide the current location and/or the set of co-ordinates, e.g., as trigger event information, to the gateway 108, 606. The first communication interface 110 and/or second communication interface 112 may provide diagnostic information, e.g., as the trigger event information, to the gateway 108, 608.

A user 104 may schedule the OTA update for at least one component of the electronic control subsystem 114, such as to occur at a predetermined time, by utilizing the user device 102, thereby generating the scheduled update request 610. The user device 10 may then provide the scheduled update request to the at least one remote server of the cloud 106, 612. The at least one remote server may generate file information based on the received scheduled update request 614. The at least one remote server may then provide the file information, e.g., as the trigger event information, along with the update file to the gateway 108, 616. In one implementation, he at least one remote server provides the trigger event information to the gateway 108 at the predetermined day, time, and/or range thereof The gateway 108 receives the trigger event information 618 and determines whether the file information is received from the at least one remote server 620. If received, the OTA update is initiated 626. If at step 620, the gateway 108 determines that the file information is not received, the step 622 is executed.

At step 622, the gateway 108 determines whether the vehicle is within the geo-fence perimeter. If at step 622, the gateway 108 determines that the vehicle is within the geo-fence perimeter, the step 626 is executed. If the gateway 108 determines at 622 that the vehicle is not within the geo-fence perimeter, the gateway 108 proceeds to determine whether the diagnostic information matches with at least one update condition 624. If the gateway 108 determines that the diagnostic information does not match with at least one update condition, the it may wait for further trigger event information and/or return to 620. If the gateway 108 determines that the diagnostic information matches with at least one update condition at 624, the OTA update may be initiated 626. In alternative implementations, the OTA update may be initiated upon an affirmative determination by the gateway on two more of: whether the file information is received 620, whether the vehicle is within the geo-fence perimeter 622, and whether the diagnostic information matches with the at least one update condition 624.

At 626, the gateway 108 may initiate the OTA update for updating the software and/or firmware of at least one component of the electronic control subsystem 114. Performing the OTA update by the gateway 108 is illustrated in one embodiment in conjunction with FIG. 7.

Figure 7:
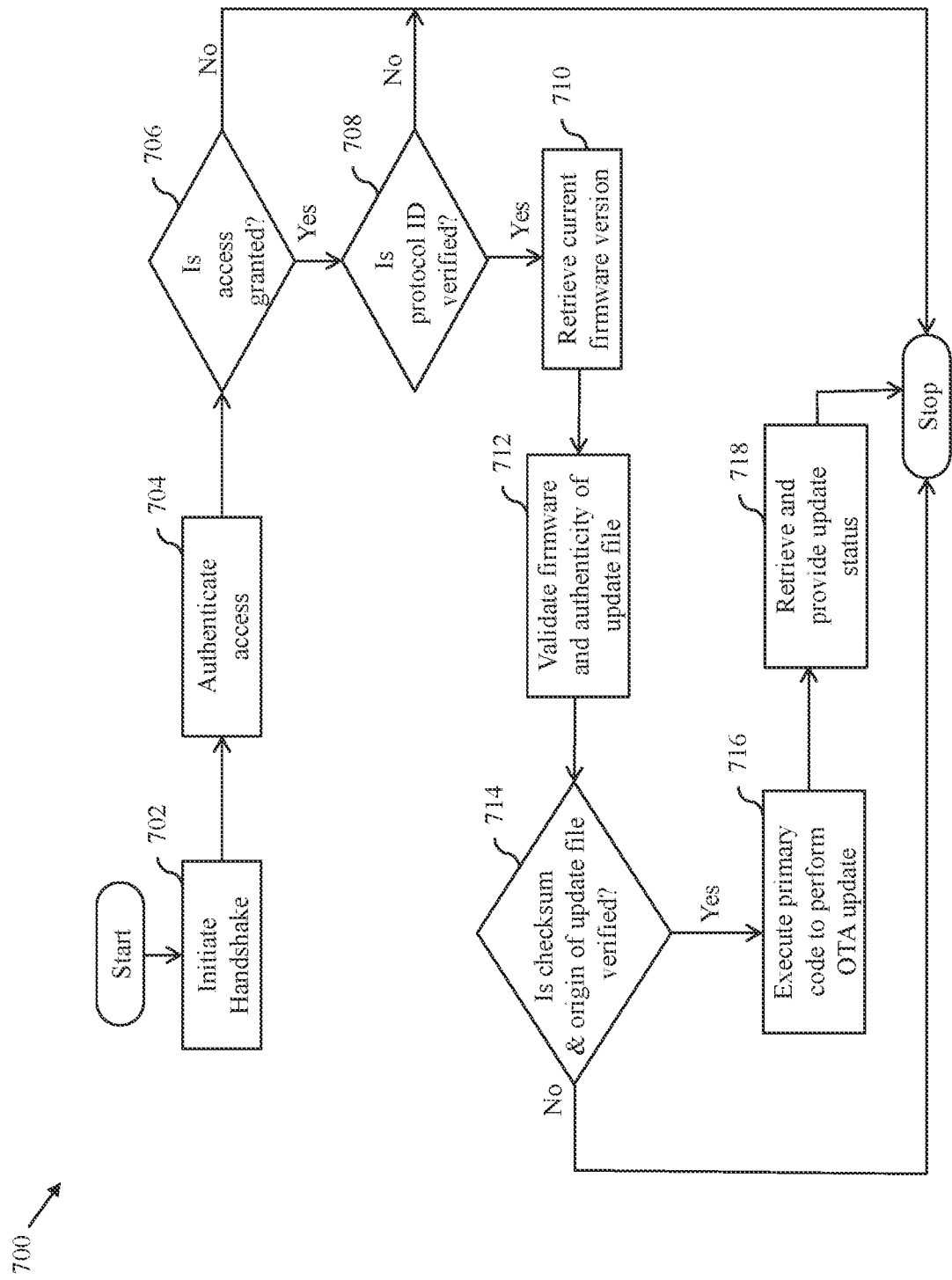
FIG. 7 shows a logic flow for performing OTA update in accordance with an embodiment of the present disclosure.

FIG. 7 shows a logic flow 700 for performing OTA update in accordance with an embodiment of the present disclosure The gateway 108 may initiate a handshake with the electronic control subsystem 114, 702. The gateway 108 may further authenticate an access to the at least one component of the electronic control subsystem 114, 704.

The gateway 108 may determine whether the access of the at least one component is granted 706, such as based on the authentication at 704. If the gateway 108 determines that access is not granted, the OTA update may be terminated. If the gateway 108 determines that access is granted, the gateway 108 may determine whether the protocol identifier (ID) is verified 708. If the gateway 108 determines that the protocol ID is not verified, the OTA update may be terminated. If the gateway 108 determines that the protocol ID is verified, the gateway 108 may retrieve a current and/or desired version of the firmware and/or the software of the at least one component 710. The gateway 108 may then validate the current and/or desired version of the firmware and/or the software of the at least one component and an authenticity of the update file 712. In one implementation, the authenticity of the update file may be validated by verifying the origin and/or the checksum of the update file based on the file information.

The gateway 108 may determine whether the checksum and/or the origin of the update file are verified 714 and, if not, the OTA update may be terminated. If the gateway 108 determines that the checksum and/or the origin of the update file are verified, it may perform the OTA update of the at least one component 716, e.g., by executing the primary code. Based on the execution of the primary code, the gateway 108 may provide the update file to the at least one component of the electronic control subsystem 114, such as by way of the first communication interface 110 and/or the second communication interface 112, for updating the firmware and/or the software for the at least one component 716.

The gateway 108 may further retrieve an update status from the at least one component and/or provide the update status to the cloud 106, 718. In one embodiment, the gateway 108 may generate a user interface that indicates, e.g., the update status and renders the user interface indicating the update status on the user device 102, such as by way of the cloud 106.

A person of ordinary skill in the art will appreciate that embodiments and exemplary scenarios of the disclosed subject matter may be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however some of the operations may in fact be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Techniques consistent with the disclosure provide, among other features, systems and methods for performing OTA update. While various exemplary embodiments of the disclosed systems and methods have been described above, it should be understood that they have been presented for purposes of example only, and not limitations. It is not exhaustive and does not limit the disclosure to the precise form disclosed. Modifications and variations are possible in light of the above teachings or may be acquired from practicing of the disclosure, without departing from the breadth or scope.

While various embodiments of the disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

Although the disclosure is described herein with reference to specific embodiments, various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to disclosures containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

Unless otherwise stated, conditional languages such as "can", "could", "will", "might", or "may" are understood within the context as used in general to convey that certain embodiments include, while other embodiments do not include, certain features, elements and/or steps. Thus, such conditional languages are not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

The invention claimed is:

1. A system, comprising:
a first communication interface;
an electronic control subsystem of a vehicle coupled to the first communication interface; and
a gateway coupled to the electronic control subsystem by way of the first communication interface, and configured to:
receive trigger event information from at least one remote server;
detect a trigger condition based on the trigger event information;
initiate, based on the detection of the trigger condition, a handshake with the electronic control subsystem; and
provide an update file to the electronic control subsystem by way of the first communication interface, wherein the update file is configured to update a software or a firmware for at least one component of the electronic control subsystem.

2. The system of claim 1, wherein the gateway is further configured to:
receive the update file from the at least one remote server.

3. The system of claim 1, wherein the at least one component of the electronic control subsystem is configured to provide an update status associated with the update of the software or the firmware to the gateway.

4. A system, comprising:
a first communication interface;
an electronic control subsystem of a vehicle coupled to the first communication interface; and
a gateway coupled to the electronic control subsystem by way of the first communication interface, and configured to:
receive trigger event information in response to a scheduled update request provided by a user device;
detect a trigger condition based on the trigger event information;
initiate, based on the detection of the trigger condition, a handshake with the electronic control subsystem; and
provide an update file to the electronic control subsystem by way of the first communication interface, wherein the update file is configured to update a software or a firmware for at least one component of the electronic control subsystem.

5. The system of claim 4, wherein the scheduled update request is provided to at least one remote server, causing the remote server to provide the trigger event information to the gateway.

6. The system of claim 5, wherein the scheduled update request includes at least one of a user identifier, a vehicle identifier, a file name, a predetermined time, and a user token.

7. A system comprising:
a first communication interface;
an electronic control subsystem of a vehicle coupled to the first communication interface; and
a gateway coupled to the electronic control subsystem by way of the first communication interface, and configured to:
receive trigger event information;
detect a trigger condition based on the trigger event information;
initiate, based on the detection of the trigger condition, a handshake with the electronic control subsystem; and
provide an update file to the electronic control subsystem by way of the first communication interface, wherein the update file is configured to update a software or a firmware for at least one component of the electronic control subsystem; and
a geo-fence system coupled to the gateway and configured to provide a current location of the vehicle,
wherein the detection of the trigger condition is based on a determination of whether the current location of the vehicle is within a predetermined area.

8. A system, comprising:
a first communication interface;
an electronic control subsystem of a vehicle coupled to the first communication interface; and
a gateway coupled to the electronic control subsystem by way of the first communication interface, and configured to:
receive trigger event information;
detect a trigger condition based on the trigger event information;
initiate, based on the detection of the trigger condition, a handshake with the electronic control subsystem; and
provide an update file to the electronic control subsystem by way of the first communication interface, wherein the update file is configured to update a software or a firmware for at least one component of the electronic control subsystem;
authenticate an access of the at least one component of the electronic control subsystem; and
upon successful authentication, verify a set of parameters associated with the update of the software or the firmware for the at least one component.

9. The system of claim 8, wherein the gateway is further configured to:
retrieve a current version of the firmware or the software of the at least one component; and
validate the current version of the firmware or the software of the at least one component.

10. The system of claim 8, wherein the set of parameters includes at least one of a protocol identifier, an origin, and a checksum of the update file.

11. A system, comprising:
a first communication interface;
an electronic control subsystem of a vehicle coupled to the first communication interface; and
a gateway coupled to the electronic control subsystem by way of the first communication interface, and configured to:
receive trigger event information wherein the trigger event information is received in response to a scheduled update request provided by a user device;
detect a trigger condition based on the trigger event information;
initiate, based on the detection of the trigger condition, a handshake with the electronic control subsystem; and
provide an update file to the electronic control subsystem by way of the first communication interface, wherein the update file is configured to update a software or a firmware for at least one component of the electronic control subsystem; and
a second communication interface coupled to the gateway, and configured to provide diagnostic information to the gateway,
wherein the detection of the trigger condition is based on a determination of whether the diagnostic information matches at least one update condition.

12. A method, comprising:
receiving trigger event information at a gateway;
detecting a trigger condition based on the trigger event information;
initiating, based on the detection of the trigger condition, a handshake with an electronic control subsystem of a vehicle;
providing an update file to the electronic control subsystem by way of a first communication interface, wherein the update file is configured to update a software or a firmware for at least one component of the electronic control subsystem;
receiving, from a geo-fence system, a current location of the vehicle; and
determining whether the current location of the vehicle is within a predetermined area,
wherein detecting the trigger condition is based on the determination of whether the current location of the vehicle is within the predetermined area.

13. The method of claim 12, further comprising:
receiving the update file from at least one remote server.

14. The method of claim 13, wherein the update file is received based on a scheduled update request generated by a user device.

15. The method of claim 14, wherein the scheduled update request includes at least one of a user identifier, a vehicle identifier, a file name, and a user token.

16. The method of claim 13, further comprising:
receiving, from the at least one component, an update status associated with the update of the software or the firmware from the at least one component; and
providing the update status to the remote server.

17. A method, comprising:
receiving trigger event information at a gateway;
detecting a trigger condition based on the trigger event information;
initiating, based on the detection of the trigger condition, a handshake with an electronic control subsystem of a vehicle;
providing an update file to the electronic control subsystem by way of a first communication interface, wherein the update file is configured to update a software or a firmware for at least one component of the electronic control subsystem;

authenticating an access of the at least one component of the electronic control subsystem; and verifying, upon successful authentication, a set of parameters associated with the update of the software or the firmware for the at least one component.

18. The method of claim 17, further comprising:

retrieving a current version of the firmware or the software of the at least one component; and validating the current version of the firmware or the software of the at least one component.

19. The method of claim 17, wherein the set of parameters includes at least one of a protocol identifier, an origin, and a checksum of the update file.

20. A method, comprising:

receiving trigger event information at a gateway;

detecting a trigger condition based on the trigger event information;

initiating, based on the detection of the trigger condition, a handshake with an electronic control subsystem of a vehicle;

providing an update file to the electronic control subsystem by way of a first communication interface, wherein the update file is configured to update a software or a firmware for at least one component of the electronic control subsystem;

receiving diagnostic information from a second communication interface; and determining whether the diagnostic information matches at least one update condition, wherein detecting the trigger condition is based on the determination of whether the diagnostic information matches the at least one update condition.

* * * * *